United States Patent
Kanagarathinam et al.

(10) Patent No.: US 11,871,265 B2
(45) Date of Patent: Jan. 9, 2024

(54) METHOD AND AN ELECTRONIC DEVICE FOR DYNAMICALLY CONTROLLING TCP CONGESTION WINDOW

(71) Applicant: Samsung Electronics Co., Ltd., Gyeonggi-do (KR)

(72) Inventors: Madhan Raj Kanagarathinam, Bangalore (IN); Sukhdeep Singh, Bangalore (IN); Irlanki Sandeep, Bangalore (IN); Ankur Chauhan, Bangalore (IN); Avinash Bhat, Bangalore (IN); Hongshik Kim, Gyeonggi-do (KR); Sungin Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 159 days.

(21) Appl. No.: 16/963,126

(22) PCT Filed: Jan. 18, 2019

(86) PCT No.: PCT/KR2019/000763
§ 371 (c)(1),
(2) Date: Jul. 17, 2020

(87) PCT Pub. No.: WO2019/143181
PCT Pub. Date: Jul. 25, 2019

(65) Prior Publication Data
US 2020/0382991 A1      Dec. 3, 2020

(30) Foreign Application Priority Data

Jan. 18, 2018  (IN) .............................. 201841002139
Jan. 11, 2019  (IN) .............................. 201841002139

(51) Int. Cl.
*H04W 28/02* (2009.01)
*H04L 47/193* (2022.01)
*H04L 47/27* (2022.01)

(52) U.S. Cl.
CPC ....... *H04W 28/0289* (2013.01); *H04L 47/193* (2013.01); *H04L 47/27* (2013.01)

(58) Field of Classification Search
None
See application file for complete search history.

(56) References Cited

U.S. PATENT DOCUMENTS

2002/0150048 A1  10/2002  Ha et al.
2003/0149785 A1*  8/2003  Gerla ...................... H04L 47/11
                                                709/232

(Continued)

FOREIGN PATENT DOCUMENTS

CN     105141542     12/2015
CN     106789718      5/2017

(Continued)

OTHER PUBLICATIONS

Indian Office Action dated Nov. 5, 2020 issued in counterpart application No. 201841002139, 6 pages.

(Continued)

*Primary Examiner* — Alex Skripnikov
(74) *Attorney, Agent, or Firm* — The Farrell Law Firm, P.C.

(57) ABSTRACT

Accordingly the embodiments herein provide a method for dynamically controlling a TCP congestion window. The method includes estimating, by an electronic device 100, a real time available bandwidth for an available network. Further, the method includes deriving, by the electronic device 100, a dynamic congestion window control factor from the estimated real time available bandwidth. Further, (Continued)

the method includes modifying, by the electronic device 100, the congestion window based on the derived dynamic congestion window control factor. In an embodiment, the congestion window is modified by passing the real time available bandwidth information from a lower layer of a modem to a higher layer of a TCP Stack and adjusting the congestion window.

11 Claims, 5 Drawing Sheets

(56) References Cited

U.S. PATENT DOCUMENTS

| | | | |
|---|---|---|---|
| 2004/0242219 A1* | 12/2004 | Oie | H04L 69/16 |
| | | | 455/450 |
| 2007/0165531 A1 | 7/2007 | Labrador et al. | |
| 2014/0241163 A1 | 8/2014 | Lee et al. | |
| 2014/0293823 A1* | 10/2014 | Lee | H04N 21/6373 |
| | | | 370/252 |
| 2015/0341891 A1* | 11/2015 | Pentti | H04W 4/33 |
| | | | 455/456.1 |
| 2017/0171284 A1 | 6/2017 | Lee et al. | |
| 2017/0289041 A1 | 10/2017 | Li et al. | |

FOREIGN PATENT DOCUMENTS

| | | |
|---|---|---|
| KR | 1020140110184 | 9/2014 |
| WO | WO 2016/095568 | 6/2016 |

OTHER PUBLICATIONS

PCT/ISA/210 Search Report issued on PCT/KR2019/000763, dated Apr. 22, 2019, pp. 4.
PCT/ISA/237 Written Opinion issued on PCT/KR2019/000763, dated Apr. 22, 2019, pp. 5.
Indian Hearing Office Action dated Aug. 21, 2023 issued in counterpart application No. 201841002139, 2 pages.

* cited by examiner

[Fig. 1]
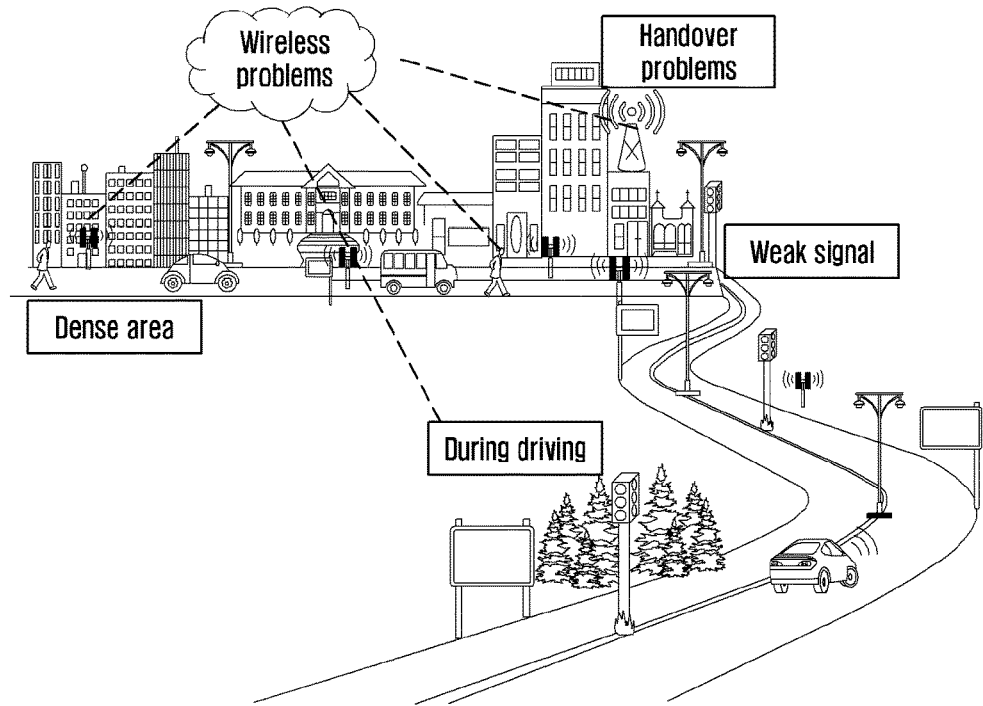
[Fig. 2]
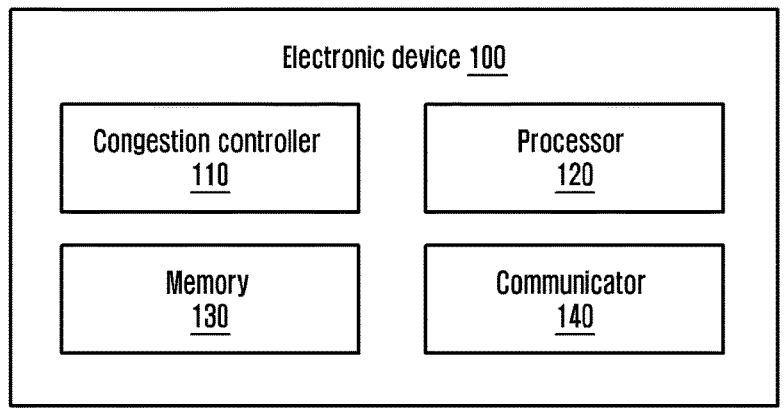
[Fig. 3]
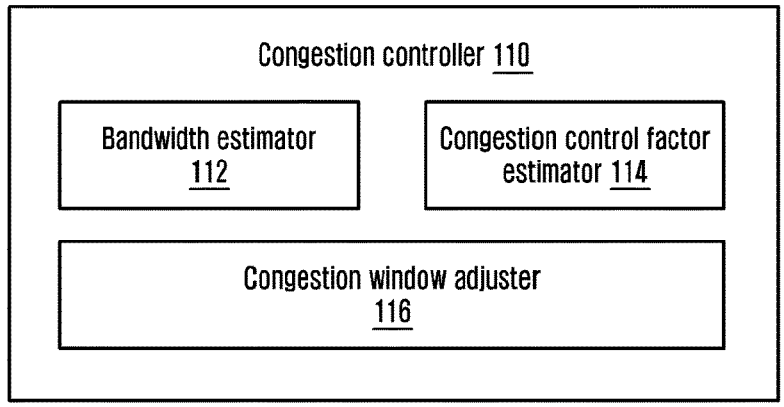

[Fig. 4]
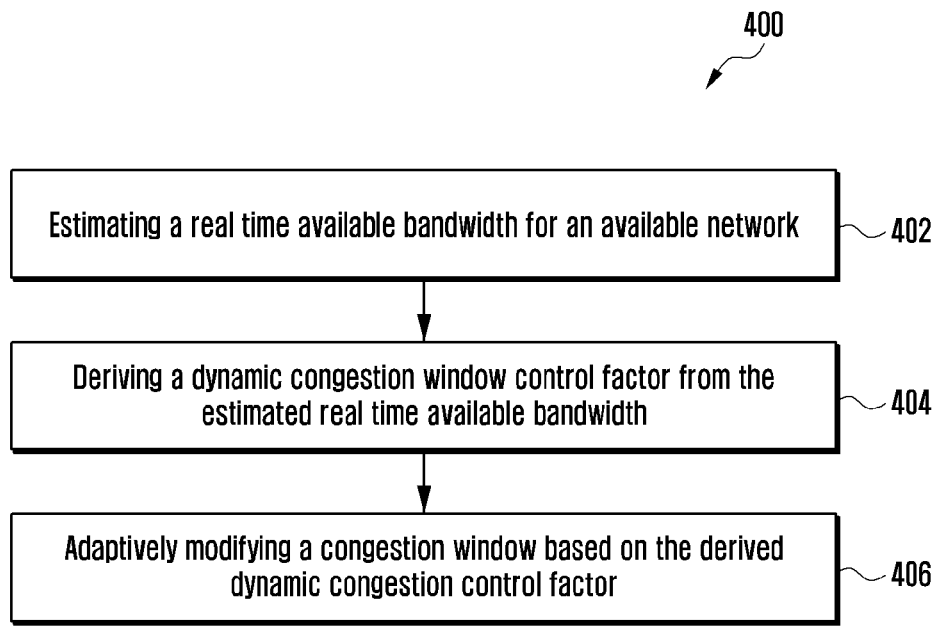
[Fig. 5]
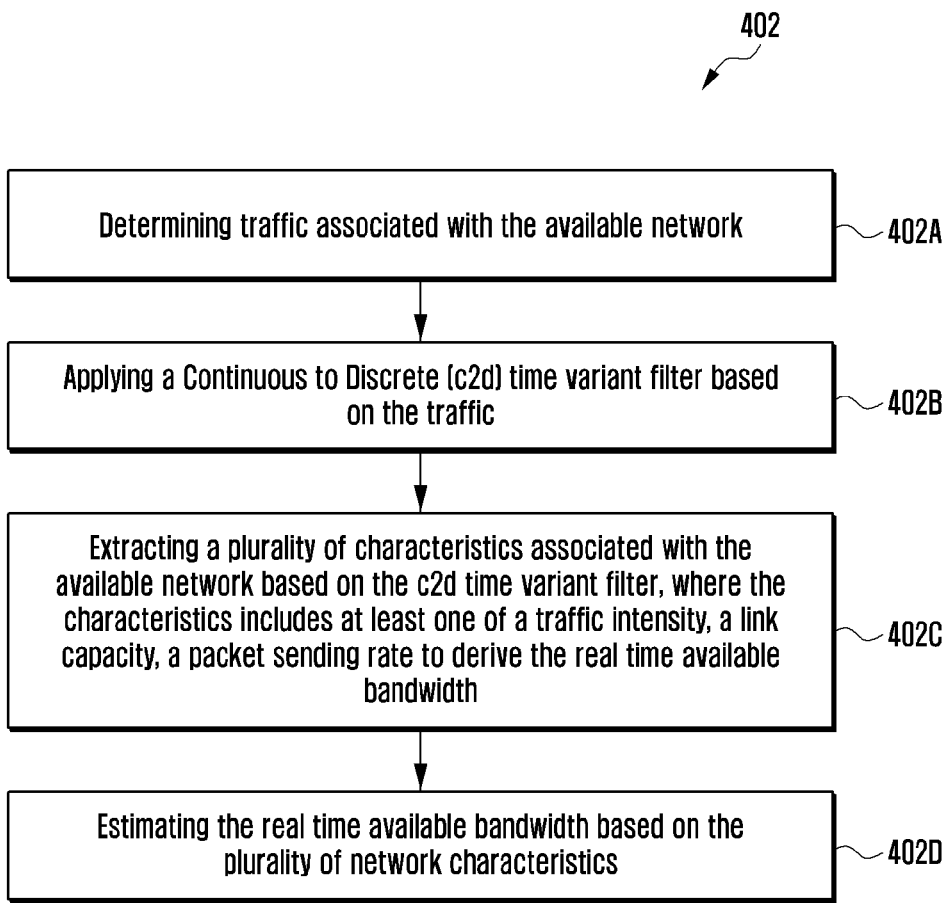

[Fig. 6]
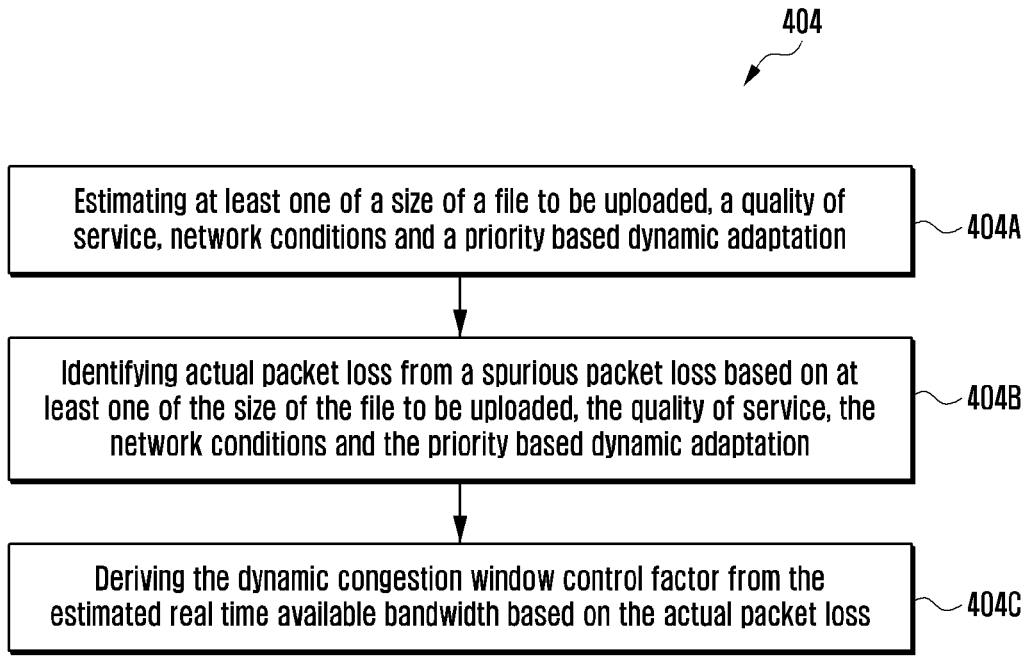
[Fig. 7]
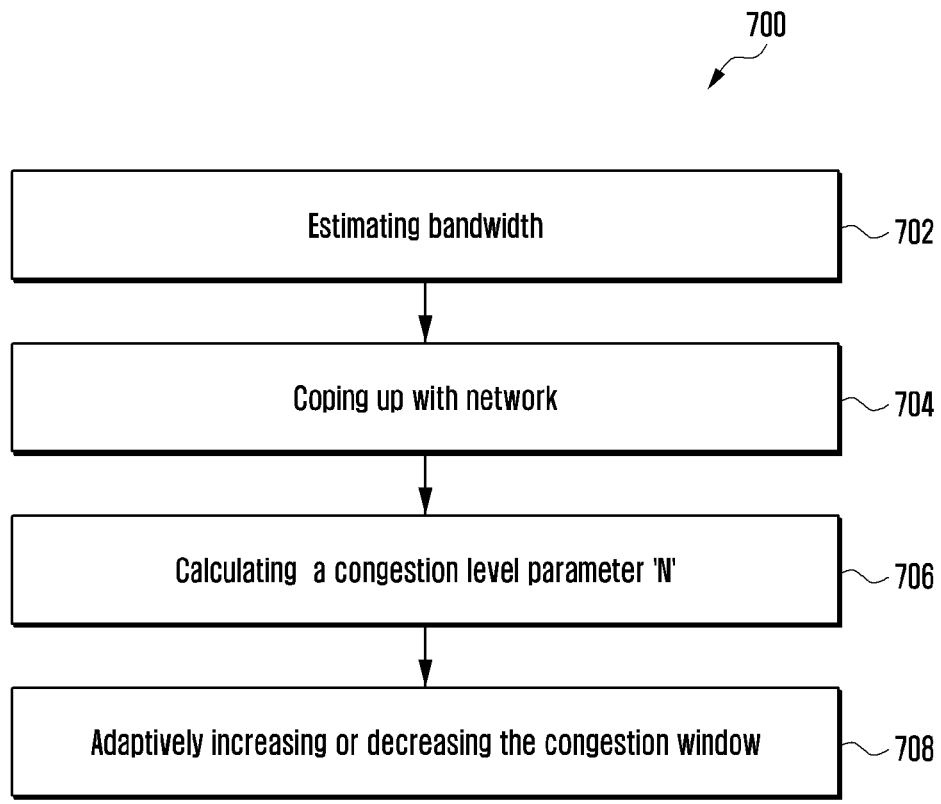

[Fig. 8]
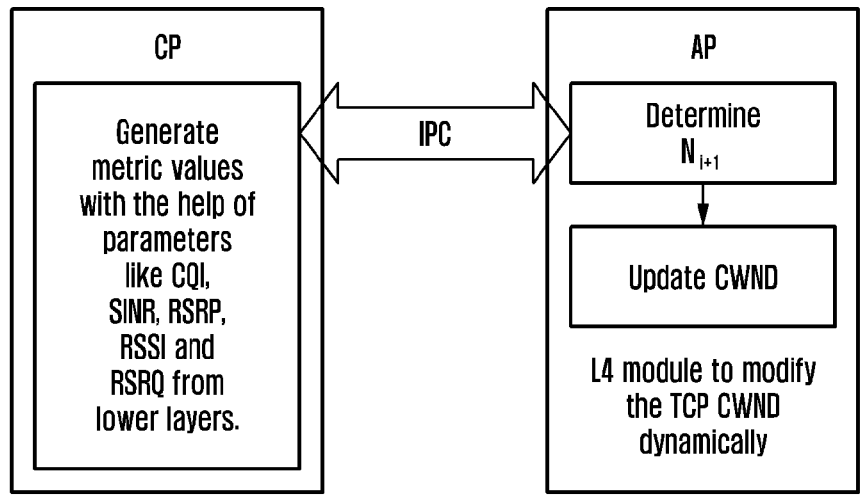
[Fig. 9]
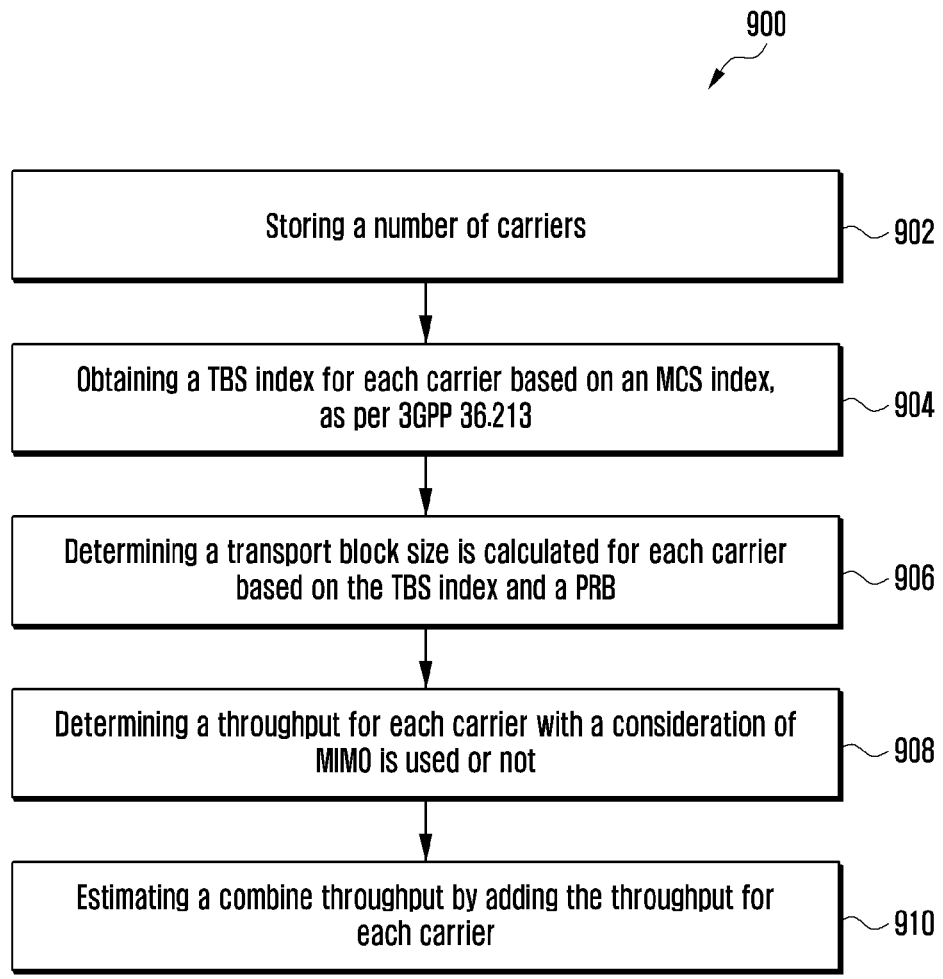

[Fig. 10]
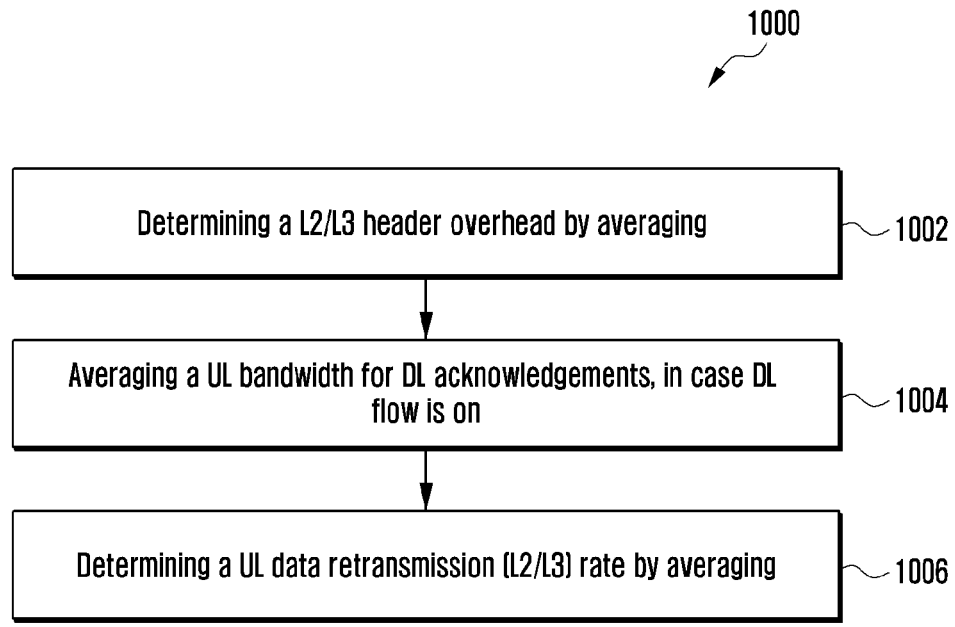
[Fig. 11]
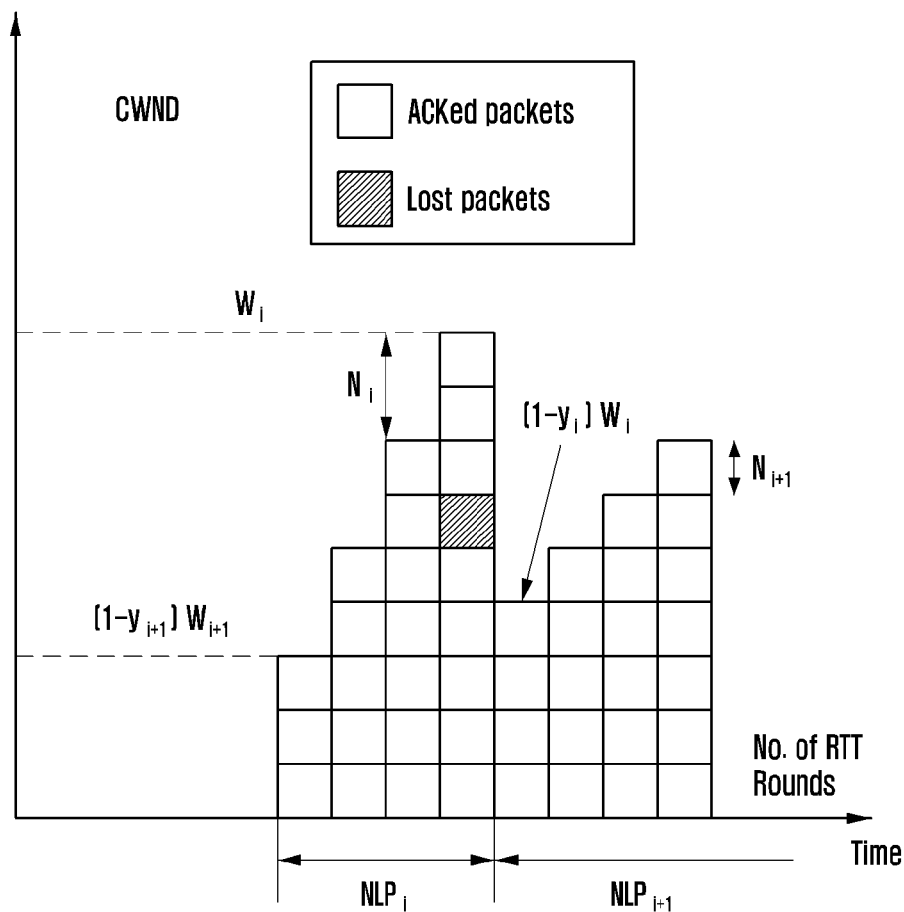

METHOD AND AN ELECTRONIC DEVICE FOR DYNAMICALLY CONTROLLING TCP CONGESTION WINDOW

PRIORITY

This application is a National Phase Entry of PCT International Application No. PCT/KR2019/000763 which was filed on Jan. 18, 2019, and claims priority to Indian Provisional Patent Application No. 201841002139 (PS), which was filed on Jan. 18, 2018, and Indian Non-Provisional Patent Application No. 201841002139 (CS), which was filed on Jan. 11, 2019, the content of each of which is incorporated herein by reference.

TECHNICAL FIELD

The present disclosure relates to controlling a congestion in a network, and more specifically to a method and an electronic device for dynamically controlling Transmission Control Protocol (TCP) congestion window. The present application is based on, and claims priority from an Indian Application Number 201841002139 filed on 18 Jan. 2018 the disclosure of which is hereby incorporated by reference herein.

BACKGROUND ART

TCP has been adopted widely by computer applications and mobile applications for streaming media, peer-to-peer file sharing, emailing, file transferring, accessing World Wide Web (www), remote administration, enabling secure shell etc. Many real time applications have emerged for using services includes Internet of Things (IoT), D2D (Device to Device) communications, Internet of Vehicles (IoV) etc., due to an evolution of a next generation mobile network. The applications demands a high network bandwidth and a quick data transmission for using the services, which causes TCP congestion in the next generation mobile network.

FIG. 1 is a schematic diagram illustrating problems faced for data communication in a next generation mobile network. There are several technical issues associated with the TCP over 5G New Radio (NR). For transmission of data over internet, the TCP is preferred to be a most reliable protocol for many applications. A user experience and an end-to-end connection performance is mostly dependents on how the TCP interacts with other layers. Over the last decade, the TCP has been extensively studied for mobile wireless networks mostly sub-6 GHz LTE/LTE-A networks. However, an impact of 5G mmWave links on the TCP is much more disruptive than the LTE/LTE-A networks. This is due to some main mmWave characteristics like:
1. High blockage sensitivity causing a higher outage leading to slow growth of a congestion window and multiple retransmission timeouts.
2. Highly variable channel causes channel fluctuations i.e. Non-Line-of-Sight (NLOS)/Line-of-Sight (LOS) transitions.

Particularly in NLOS conditions, channel losses are masked by using retransmissions at a link level, where the TCP remains unaware of such variable channel conditions. Due to the aforesaid characteristics of the mmWave, packets keeps on buffering in different layers due to increase in the congestion window. This in turn leads to buffer-bloat phenomenon causing significant increase in an end-to-end latency. To avoid same, an Active Queue Management (AQM) methodologies and cross layer approach for downlinks have been proposed for mmWave channel. Existing methods considers cross layer congestion for uplink channel. Several existing techniques are available to detect a packet loss either due to the congestion or due to a disconnection caused by the mmWave, which can be prevented by using retransmission timeouts.

Existing systems on TCP mmWave New Radio are limited to a single next generation node B (gNB). A motivation is there to analyze a TCP performance on a live air more realistic scenarios with multiple base stations. Timely adaptation of serving the gNBs is beneficial for the TCP. However considering a frequent handover case in the mmWave based the 5G NR, it can negatively affect the end-to-end latency and a TCP throughput. Therefore, it is necessary to adapt mobility techniques that minimizes the aforesaid packet losses cause due to the handovers and the delay caused due to switching between different gNBs or different radio access technologies in case of 5G HetNet scenarios. Moreover, while designing a backhaul and core networks for the mmWave based 5G NR, it is crucial to curtail the end-to-end latency. The mmWave 5G networks are high Bandwidth Delay Product (BDP) networks. This is because of availability of Gb/s order of bandwidth at a physical layer. On the other hand, existing TCP congestion control systems are not capable enough to tackle high BDP scenarios.

Due to bursty and dynamic nature of data traffic in the next generation 5G mobile networks, sporadic losses might cause due to a high Bandwidth Error Rate (BER), varying network signal conditions, mobility, a congested path, handoff problems, lengthy or frequent disconnections and the like. Considering an example, when a user tries to upload a video while traveling, the user might experience data stalling due to the varying network conditions. On the other hand, during peak hours when the network saturates due to a high number of users in a particular cell, high packet loss might be there as shown in the FIG. 1. The existing congestion control methods such as TCP Reno, TCP New Reno, TCP Tahoe, TCP Cubic etc. are not designed to dynamically control or minimize the packet losses, which in turn leads to unnecessary drops in congestion window. Therefore, efficiency of TCP mobile receivers or senders decreases drastically.

Most of these TCP variants increase congestion window aggressively to address the unnecessary drops in congestion window, but sometimes fail to control the congestion in a lossy, a dynamic or a high BDP networks and during a high load. Few more variants such as TCP Veno, TCP BBR, TCP Westwood etc. address the congestion control issue in the mobile networks, but fails to achieve higher throughput than aforementioned methods. A motivation is there to design a dynamic algorithm to overcome the aforesaid losses and to attain higher throughput than the existing methods while maintaining friendliness and fairness.

Thus, it is desired to address the above mentioned disadvantages or other shortcomings or at least provide a useful alternative.

DISCLOSURE OF INVENTION

Technical Problem

The principal object of the embodiments herein is to provide a method and an electronic device for dynamically controlling a TCP congestion window.

Another object of the embodiments herein is to estimate a real time available bandwidth for an available network.

Another object of the embodiments herein is to derive a dynamic congestion window control factor from the estimated real time available bandwidth.

Another object of the embodiments herein is to modify the congestion window based on the derived dynamic congestion window control factor.

Another object of the embodiments herein is to pass information of the real time available bandwidth from a lower layer of a modem to a higher layer of a TCP Stack and adjusting the congestion window.

Solution to Problem

Accordingly the embodiments herein provide a method for dynamically controlling a TCP congestion window. The method includes estimating, by an electronic device, a real time available bandwidth for an available network. Further, the method includes deriving, by the electronic device, a dynamic congestion window control factor from the estimated real time available bandwidth. Further, the method includes modifying, by the electronic device, the congestion window based on the derived dynamic congestion window control factor.

In an embodiment, estimating the real time available bandwidth incudes determining traffic associated with the available network, applying a Continuous to Discrete (c2d) time variant filter based on the traffic, extracting a plurality of characteristics associated with the available network based on the c2d time variant filter, wherein the characteristics comprises at least one of a traffic intensity, a link capacity, a packet sending rate to derive the real time available bandwidth and estimating the real time available bandwidth based on the plurality of network characteristics.

In an embodiment, the congestion window is modified by passing real time available bandwidth information from a lower layer of a modem to a higher layer of a TCP Stack and adjusting the congestion window.

In an embodiment, deriving the dynamic congestion window control factor from the estimated real time available bandwidth includes estimating at least one of a size of a file to be uploaded, a quality of service, network conditions, and a priority based dynamic adaptation, identifying actual packet loss from a spurious packet loss based on at least one of the size of the to be uploaded, the quality of service, the network conditions, and the priority based dynamic adaptation and deriving the dynamic congestion window control factor from the estimated real time available bandwidth based on the actual packet loss.

In an embodiment, modifying the congestion window based on the derived dynamic congestion window control factor includes increasing the congestion window or decreasing the congestion window.

In an embodiment, increasing the congestion window incudes determining a current bandwidth of a connection, dynamically determining whether with the current bandwidth is lower than the estimated real time available bandwidth, aggressively increasing the congestion window when the current bandwidth is lower than the estimated real time available bandwidth and steadily increasing the congestion window when the current bandwidth is not lower than the estimated real time available bandwidth.

In an embodiment, decreasing the congestion window includes determining whether network conditions are fluctuating, deriving whether a packet loss is due to congestion or due to the fluctuating network conditions, determining the dynamic congestion window control factor when the packet loss is due to the fluctuating network conditions and decreasing the congestion window based on the dynamic congestion window control factor.

In an embodiment, determining whether the network conditions are fluctuating includes, deriving a Signal to Interference plus Noise Ratio (SINR) and a Received Signal Strength Indication (RSSI) variations based on a filter based approach and determining whether the network conditions are fluctuating based on the SINR and the RSSI variations.

Accordingly the embodiments herein provide an electronic device for dynamically controlling a TCP congestion window. The electronic device includes a memory, a processor and a congestion controller, where the congestion controller is operably coupled to the memory and the processor. The congestion controller is configured to estimate a real time available bandwidth for an available network. Further, the congestion controller is configured to derive a dynamic congestion window control factor from the estimated real time available bandwidth. Further, the congestion controller is configured to modify the congestion window based on the derived dynamic congestion window control factor.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Advantageous Effects of Invention

The embodiments of the present invention provide a method and an electronic device for dynamically controlling a TCP congestion window.

The embodiments of the present invention estimate a real time available bandwidth for an available network.

The embodiments of the present invention derive a dynamic congestion window control factor from the estimated real time available bandwidth.

The embodiments of the present invention modify the congestion window based on the derived dynamic congestion window control factor.

The embodiments of the present invention pass information of the real time available bandwidth from a lower layer of a modem to a higher layer of a TCP Stack and adjusting the congestion window.

BRIEF DESCRIPTION OF DRAWINGS

This method and system is illustrated in the accompanying drawings, throughout which like reference letters indicate corresponding parts in the various figures. The embodiments herein will be better understood from the following description with reference to the drawings, in which:

FIG. 1 is a schematic diagram illustrating problems faced for data communication in a next generation mobile network, according to a prior art;

FIG. 2 is a block diagram of an electronic device for dynamically controlling a TCP congestion window, according to an embodiment as disclosed herein;

FIG. 3 is a block diagram of a congestion controller in the electronic device, according to an embodiment as disclosed herein;

FIG. 4 is a flow diagram illustrating a method for dynamically controlling the TCP congestion window by the electronic device, according to an embodiment as disclosed herein;

FIG. 5 is a flow diagram illustrating steps in estimating a real time available bandwidth for an available network, according to an embodiment as disclosed herein;

FIG. 6 is a flow diagram illustrating steps in deriving a dynamic congestion window control factor from the estimated real time available bandwidth, according to an embodiment as disclosed herein;

FIG. 7 is a flow diagram illustrating steps in dynamically controlling the TCP congestion window by the electronic device, according to an embodiment as disclosed herein;

FIG. 8 is a schematic diagram illustrating passing of information of the real time available bandwidth from a lower layer of a modem to a higher layer of a TCP Stack for adjusting a congestion window, according an embodiment as disclosed herein;

FIG. 9 is a flow diagram illustrating steps in estimating the real time available bandwidth for an upload, according to an embodiment as disclosed herein;

FIG. 10 is a flow diagram illustrating steps in determining an overhead deduction, according to an embodiment as disclosed herein; and FIG. 11 is a schematic diagram of growth in a no loss period of the congestion window, according to an embodiment as disclosed herein.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g. one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

A D-TCP-Dynamic TCP congestion control method is proposed in this disclosure for next generation mobile networks. Major steps in controlling a TCP congestion are given below:

(1) D-TCP provides a real time estimation of an available bandwidth of a mobile networks. A system is proposed that can estimate a real time bandwidth by applying Continuous to Discrete (c2d) time variant filter based on a traffic flowing. The steps include extracting an end-to-end characteristics (like traffic intensity, link capacity, packet sending rate) to derive the available bandwidth. The D-TCP can quickly adapt to new circumstances and achieve a good estimation performance in case of abrupt changes or aburst loss conditions thereby, avoiding an aliasing effect.

(2) Derives the dynamic congestion control factor 'N' (i.e., dynamic congestion window control factor) based on the estimated bandwidth, where 'N' is used to increase/decrease a Congestion Window (CWND) during an RTT update and a loss detection respectively.

(3) Measures the mobile network performance characteristics and adaptively modifies the CWND based on the dynamic congestion control factor N measured. By doing so, the D-TCP can avoid CWND drops caused due to a spurious packet loss. It can update the CWND appropriately during burst losses. Hence, a complete available bandwidth can be utilized.

Unlike Parallel TCP, the proposed method used to open multiple sockets for full utilization but we control the CWND growth efficiently. Opening multiple sockets is not desirable as it violates the fairness and also impacts the power consumption of mobile networks. An object of the invention is to develop a reliable and an efficient available bandwidth measurement method with no or very few requirement of resources for data processing and memory.

Unlike existing methods, the proposed method includes estimating the real time available bandwidth for the available network in case of abrupt changes or burst loss conditions. Therefore, the proposed method enables an electronic device to quickly adapt the CWND in circumstances such as an area with saturated amount of users, varying network signal condition, mobility of a user device, a congested path etc.

Unlike the existing methods, the proposed method is reliable and power efficient for measuring the real time available bandwidth, using less amount of device resources for data processing and memory.

Unlike existing methods, the proposed method can be used to eliminate an occurrence of data loss or CWND drops caused due to transmission errors (or other wireless errors) and TCP congestion. Therefore, the method enables the electronic device to utilize the real time available bandwidth completely and provide substantially a higher throughput.

Referring now to the drawings, and more particularly to FIGS. 2 through 11, there are shown preferred embodiments.

FIG. 2 is a block diagram of an electronic device 100 for dynamically controlling a TCP congestion window, according to an embodiment as disclosed herein. An example for the electronic device 100 can be, but not limited to a user equipment, a smart phone, a tablet computer, a personal computer, a desktop computer, a mobile device, a Personal Digital Assistance (PDA), a multimedia device, a vehicle embedded with a user equipment, an IoT and the like. In an embodiment, the electronic device 100 includes a congestion controller 110, a processor 120, a memory 130 and a communicator 140. The congestion controller 110 is operably coupled to the memory 130 and the processor 120. The congestion controller 110 is configured to estimate a real time available bandwidth $BW_E$ for an available network. An example for the available network can be, but not limited to a next generation mobile network, a Wi-Fi network, mmWave New Radio (mm Wave NR) network etc. Example for the network terminal can be, but not limited to a base station, a Wi-Fi router.

In an embodiment, the congestion controller 110 is configured to determine traffic associated with the available network for estimating the real time available bandwidth $BW_E$ for the available network. Further, the congestion controller 110 is configured to apply a c2d time variant filter based on the traffic for estimating the real time available bandwidth $BW_E$ for the available network. An estimated available bandwidth $B_i$ at instance i is given in equation-1.

$$B_i = \frac{d_i}{t_i - t_{i-1}} = \frac{d_i}{\Delta_i} \qquad \text{[Equation-1]}$$

where $d_i$ is data transferred between time interval $t_{i-1}$ and $t_i$. $\Delta_i$ is a time difference.

Further, the congestion controller 110 is configured to extract a plurality of characteristics associated with the available network based on the c2d time variant filter for estimating the real time available bandwidth $BW_E$ for the available network, where the characteristics includes a traffic intensity, a link capacity, a packet sending rate to derive the real time available bandwidth $BW_E$. In an embodiment, the estimated available bandwidth $B_i$ models as a discrete time linear system. In an example, the electronic device 100 uses a discrete time filter using a Tustin approximation for estimating the available bandwidth $B_i$. A filtered available bandwidth $B_f$ at interval $T_f$ is given in equation-2.

$$B_f = \left[\frac{\frac{2\tau}{\Delta_i} - 1}{\frac{2\tau}{\Delta_i} + 1} \times (B_{f-1}|)\right] + \left[\frac{B_i + B_{i+1}}{\frac{2\tau}{\Delta_i} + 1}\right] \qquad \text{[Equation-2]}$$

where $$\frac{1}{\tau}$$

is a cut off frequency. Consider, a constant $\alpha_i$, which is given in equation-3.

$$\alpha_i = \frac{2\tau - \Delta_i}{2\tau + \Delta_i} \qquad \text{[Equation-3]}$$

The equation-2 is rewritten as in equation-4, by using the constant $\alpha_i$.

$$B_f = \alpha_i B_{f-1} + (1 - \alpha_i)\left(\frac{B_i + B_{i-1}}{2}\right) \qquad \text{[Equation-4]}$$

Further, the congestion controller 110 is configured to estimate the real time available bandwidth $BW_E$ based on the plurality of the network characteristics. In an example, the constant $\alpha_i$ is taken as 0.90. Hence equation-4 is rewritten as in equation-5.

$$B_f = 0.90\ B_{f-1} + 0.10\ B_i \qquad \text{[Equation-5]}$$

In an embodiment, the electronic device 100 normalizes the filtered available bandwidth $B_i$ to avoid a packet aliasing effect from a low pass filter output and the estimated available bandwidth $B_i$ to obtain the real time available bandwidth $BW_E$.

The filtered available bandwidth $B_f$ in the available network (e.g. mmWave NR) fluctuates due to varying network conditions during Line of Sight (LOS) to Non Line of Sight (NLOS) transitions. In an embodiment, the electronic device 100 normalizes the fluctuations in the filtered available bandwidth $B_f$ and a Signal to Interference Noise Ratio (SINR) variations as given in equation-6:

$$\text{norm} = (B_i - B_f) + (\text{SINR}_i - \text{SINR}_A) \qquad \text{[Equation-6]}$$

where, norm is an error normalization parameter used to cope up ad-hoc network conditions. $\text{SINR}_i$ and $\text{SINR}_A$ is a current SINR and an average SINR respectively.

The expression for the estimated real time available bandwidth $BW_E$ is given in the equation-7.

$$BW_E = B_f + g \times \text{norm} \qquad \text{[Equation-7]}$$

where g is a clock granularity. In an example, g is set as 0.5 to match with an epoch timer.

The congestion controller 110 is configured to derive a dynamic congestion window control factor $N_{i+1}$ from the estimated real time available bandwidth $BW_E$. In an embodiment, the dynamic congestion window control factor $N_{i+1}$ is used to increase and decrease the CWND during an Round Trip Time (RTT) update and loss detection respectively. A queue length of a Dynamic TCP (D-TCP or DTCP) flow is proportional to a TCP window size W. Therefore, an expected queue length E(Q) for a single flow in a proposed method is given in equation-8.

$$E(Q) = \varphi \times E[W_{SF}] \qquad \text{[Equation-8]}$$

where, $\varphi$ is boost. $E[W_{SF}]$ is the expected window size of the single TCP flow. Here, $\varphi \varepsilon (0,1)$.

The D-TCP have N different flow. Therefore, the equation-8 is rewritten as in the equation-9.

$$E(Q) = \alpha \times \frac{E[W]}{E[N]} \qquad \text{[Equation-9]}$$

where E[W] is expectation of W and E[N].

The queue length obtains during $i+1^{th}$, the dynamic congestion window control factor $N_{i+1}$ updates as in the equation-10.

$$N_{i+1} \leftarrow \max\left(1, N_i + 1 - \frac{Q_i}{\alpha \times W_i} N_i\right) \qquad \text{[Equation-10]}$$

where $N_i$, $Q_i$ and $W_i$ are N, the queue length and the window size in the $i^{th}$ period, respectively. A bytes-in-flight queue length is estimated as in the equation-11.

$$Q_i = (BW_E - BW_C) \times \frac{W_i}{BW_E} \qquad \text{[Equation-11]}$$

where BWC is a current bandwidth.

In the above equation-11, N is the congestion level parameter used for making maximum network utilization. N is aggressive when $BW_E-BW_C$ is increasing or rising, which signifies that the network is underutilized. N is passive when $BW_E-BW_C \sim 0$, which signifies an almost full utilization of the network.

Combining the equation-10 and the equation-11 to form the dynamic congestion window control factor $N_{i+1}$ as shown in equation-12.

$$N_{i+1} \leftarrow \max\left(1, N_i + 1 - \frac{BW_E - BW_C}{\alpha \times BW_E} W_i\right) \qquad \text{[Equation-12]}$$

In an embodiment, the congestion controller 110 is configured to estimate at least one of a size of a file to be uploaded, a quality of service, network conditions and a priority based dynamic adaptation for deriving the dynamic congestion window control factor $N_{i+1}$ from the estimated real time available bandwidth $BW_E$. Examples for the network conditions are, but not limited to RSSI, SNIR, Reference Signal Received Quality (RSRQ), etc. Further, the congestion controller 110 is configured to identify an actual packet loss from a spurious packet loss based on at least one of the size of the file to be uploaded, the quality of service, the network conditions and the priority based dynamic adaptation for deriving the dynamic congestion window control factor $N_{i+1}$ from the estimated real time available bandwidth $BW_E$. Further, the congestion controller 110 is configured to derive the dynamic congestion window control factor $N_{i+1}$ from the estimated real time available bandwidth $BW_E$ based on the actual packet loss.

The congestion controller 110 is configured to modify the CWND based on the derived dynamic congestion window control factor $N_{i+1}$. The CWND is adjusted according to equation-13 and equation-14.

[Equation-13]

For each RTT: CWND←CWND+$N_{i+1}$     (13)

[Equation-14]

For each Loss: CWND←CWND(1−y)

where y is given in equation-15, $$y = \frac{\eta}{[(2\eta - 1)N] + 1)} \qquad \text{[Equation-15]}$$

where η is a convergence factor for a fairness to avoid aggressiveness.

In an embodiment, modifying the CWND based on the derived dynamic congestion window control factor comprises increasing the CWND or decreasing the CWND.

In an embodiment, increasing the CWND incudes determining a current bandwidth of a connection, dynamically determining whether with the current bandwidth is lower than the estimated real time available bandwidth $BW_E$, aggressively increasing the CWND when the current bandwidth is lower than the estimated real time available bandwidth $BW_E$ and steadily increasing the CWND when the current bandwidth is not lower than the estimated real time available bandwidth $BW_E$.

In an embodiment, decreasing the CWND includes determining whether network conditions are fluctuating, deriving whether a packet loss is due to congestion or due to the fluctuating network conditions, determining the dynamic congestion window control factor when the packet loss is due to the fluctuating network conditions and decreasing the CWND based on the dynamic congestion window control factor.

In an embodiment, determining whether the network conditions are fluctuating includes, deriving the SINR and the RSSI variations based on a filter based approach and determining whether the network conditions are fluctuating based on the SINR and the RSSI variations.

In another embodiment, the CWND is modified by passing information of the real time available bandwidth $BW_E$ from a lower layer of a modem (e.g. Communication Processor (CP)) (not shown) to a higher layer of a TCP Stack and adjusting the CWND.

In an embodiment, the congestion controller 110 estimates an Upload (UL) bandwidth. The congestion controller 110 obtains a Transport Block Size (TBS) index for each carrier based on an Modulation and Coding Scheme (MCS) index, as per 3GPP 36.213, for estimating the UL bandwidth. Further, the congestion controller 110 determines a transport block size is calculated for each carrier based on TBS index and a Physical Resource Block (PRB) for estimating the UL bandwidth. Further, the congestion controller 110 determines a throughput for each carrier with a consideration of Multiple Input Multiple Output (MIMO) is used or not, for estimating the UL bandwidth. Further, the congestion controller 110 estimates a combine throughput by adding the throughput for each carrier, for estimating the UL bandwidth.

In an embodiment, the congestion controller 110 determines an overhead deduction. The congestion controller 110 determines a Layer-2/Layer-3 (L2/L3) header overhead by averaging, for determining the overhead deduction. Further, the congestion controller 110 averages the UL bandwidth for Download (DL) acknowledgements, in case DL flow is on, for determining the overhead deduction. Further, the congestion controller 110 determines a UL data retransmission rate at L2/L3 by averaging, for determining the overhead deduction.

The processor 120 (e.g. Application Processor (AP)) is configured to execute instructions stored in the memory 130 and to perform various operations.

The memory 130 stores a number of carriers. The memory 130 stores the instructions. The memory 130 may include non-volatile storage elements. Examples of such non-volatile storage elements may include magnetic hard discs, optical discs, floppy discs, flash memories, or forms of Electrically Programmable Memories (EPROM) or Electrically Erasable and Programmable (EEPROM) memories.

In addition, the memory 130 may, in some examples, be considered a non-transitory storage medium. The term "non-transitory" may indicate that the storage medium is not embodied in a carrier wave or a propagated signal. However, the term "non-transitory" should not be interpreted that the memory 130 is non-movable. In some examples, the memory 130 can be configured to store larger amounts of information than the memory 130. In certain examples, a non-transitory storage medium may store data that can, over time, change (e.g. in Random Access Memory (RAM) or cache).

The communicator 140 is configured to communicate internally between hardware components in the electronic device 100. Further, the communicator 140 is configured to communicate the electronic device 100 with the available network via a wired or wireless connection. In an example, the CP and the AP communicates using an Inter Processor Communication (IPC).

Although the FIG. 2 shows the hardware components of the electronic device 100, but it is to be understood that other embodiments are not limited thereon. In other embodiments, the electronic device 100 may include less or more number of components. Further, the labels or names of the components are used only for illustrative purpose and does not limit the scope of the invention. One or more components can be combined together to perform same or substantially similar function of dynamically controlling the TCP congestion.

FIG. 3 is a block diagram of the congestion controller 110 in the electronic device 100, according to an embodiment as disclosed herein. In an embodiment, the congestion controller 110 includes a bandwidth estimator 112, a congestion control factor estimator 114 and a congestion window adjuster 116. The bandwidth estimator 112 estimates a real time available bandwidth $BW_E$ available for the available network. In an embodiment, the bandwidth estimator 112 determines the traffic associated with the available network for estimating the real time available bandwidth $BW_E$ available for the available network. Further, the bandwidth estimator 112 applies the c2d time variant filter based on the traffic for estimating the real time available bandwidth $BW_E$ available for the available network. Further, the bandwidth estimator 112 extracts the plurality of characteristics associated with the available network based on the c2d time variant filter for estimating the real time available bandwidth $BW_E$ available for the available network, where the characteristics includes the traffic intensity, the link capacity, the packet sending rate to derive the real time available bandwidth $BW_E$. Further, the bandwidth estimator 112 estimates the real time available bandwidth $BW_E$ based on the plurality of network characteristics.

The congestion control factor estimator 114 derives the dynamic congestion window control factor $N_{i+1}$ from the estimated real time available bandwidth $BW_E$. In an embodiment, the congestion control factor estimator 114 estimates at least one of the size of the file to be uploaded, the quality of service, the network conditions and the priority based dynamic adaptation for deriving the dynamic congestion window control factor $N_{i+1}$ from the estimated real time available bandwidth $BW_E$. Further, the congestion control factor estimator 114 identifies the actual packet loss from the spurious packet loss based on at least one of the size of the file to be uploaded, the quality of service and the priority based dynamic adaptation for deriving the dynamic congestion window control factor $N_{i+1}$ from the estimated real time available bandwidth $BW_E$. Further, the congestion control factor estimator 114 derives the dynamic congestion window control factor $N_{i+1}$ from the estimated real time available bandwidth $BW_E$ based on the actual packet loss.

The congestion window adjuster 116 modifies the CWND based on the derived dynamic congestion window control factor $N_{i+1}$.

FIG. 4 is a flow diagram 400 illustrating a method for dynamically controlling the TCP congestion by the electronic device 100, according to an embodiment as disclosed herein. At 402, the method includes estimating the real time available bandwidth $BW_E$ available for the available network. In an embodiment, the method allows the bandwidth estimator 112 to estimate the real time available bandwidth $BW_E$ available for the available network. At 404, the method includes deriving the dynamic congestion window control factor $N_{i+1}$ from the estimated real time available bandwidth $BW_E$. In an embodiment, the method allows the congestion control factor estimator 114 to derive the dynamic congestion window control factor $N_{i+1}$ from the estimated real time available bandwidth $BW_E$. At 406, the method includes modifying the CWND based on the derived dynamic congestion window control factor $N_{i+1}$. In an embodiment, the method allows the congestion window adjuster 116 to modify the CWND based on the derived dynamic congestion window control factor $N_{i+1}$.

The various actions, acts, blocks, steps, or the like in the flow diagram 400 may be performed in the order presented, in a different order or simultaneously. Further, in some embodiments, some of the actions, acts, blocks, steps, or the like may be omitted, added, modified, skipped, or the like without departing from the scope of the invention.

FIG. 5 is a flow diagram 402 illustrating steps in estimating the real time available bandwidth $BW_E$ available for the available network, according to an embodiment as disclosed herein. At 402A, the method includes determining the traffic associated with the available network. In an embodiment, the method allows the bandwidth estimator 112 to determine the traffic associated with the available network. At 402B, the method includes applying the c2d time variant filter based on the traffic. In an embodiment, the method allows the bandwidth estimator 112 to apply the c2d time variant filter based on the traffic.

At 402C, the method includes extracting the plurality of characteristics associated with the available network based on the c2d time variant filter, where the characteristics includes at least one of the traffic intensity, the link capacity, the packet sending rate to derive the real time available bandwidth $BW_E$. In an embodiment, the method allows the bandwidth estimator 112 to extract the plurality of characteristics associated with the available network based on the c2d time variant filter, where the characteristics includes at least one of the traffic intensity, the link capacity, the packet sending rate to derive the real time available bandwidth $BW_E$. At 402D, the method includes estimating the real time available bandwidth $BW_E$ based on the plurality of network characteristics. In an embodiment, the method allows the bandwidth estimator 112 to estimate the real time available bandwidth $BW_E$ based on the plurality of network characteristics.

The various actions, acts, blocks, steps, or the like in the flow diagram 402 may be performed in the order presented, in a different order or simultaneously. Further, in some embodiments, some of the actions, acts, blocks, steps, or the like may be omitted, added, modified, skipped, or the like without departing from the scope of the invention.

FIG. 6 is a flow diagram 404 illustrating steps in deriving the dynamic congestion window control factor $N_{i+1}$ from the estimated real time available bandwidth $BW_E$, according to an embodiment as disclosed herein. At 404A, the method includes estimating at least one of the size of the file to be uploaded, the quality of service and the priority based dynamic adaptation. In an embodiment, the method allows the congestion control factor estimator 114 to estimate at least one of the size of the file to be uploaded, the quality of service and the priority based dynamic adaptation.

At 404B, the method includes identifying actual packet loss from a spurious packet loss based on at least one of the size of the file to be uploaded, the quality of service and the priority based dynamic adaptation. In an embodiment, the method allows the congestion control factor estimator 114 to identify actual packet loss from the spurious packet loss based on at least one of the size of the file to be uploaded, the quality of service and the priority based dynamic adaptation. At 404C, the method includes deriving the dynamic congestion window control factor $N_{i+1}$ from the estimated real time available bandwidth $BW_E$ based on the actual packet loss. In an embodiment, the method allows the congestion control factor estimator 114 to derive the dynamic congestion window control factor $N_{i+1}$ from the estimated real time available bandwidth $BW_E$ based on the actual packet loss.

The various actions, acts, blocks, steps, or the like in the flow diagram 404 may be performed in the order presented, in a different order or simultaneously. Further, in some embodiments, some of the actions, acts, blocks, steps, or the like may be omitted, added, modified, skipped, or the like without departing from the scope of the invention.

FIG. 7 is a flow diagram 700 illustrating steps 702-708 in dynamically controlling the TCP congestion window by the electronic device 100, according to an embodiment as disclosed herein. At 702, the method includes estimating bandwidth by applying Tustin approximation (i.e. continuous to discrete C2D filter). In an embodiment, the method allows the bandwidth estimator 112 to estimate the bandwidth by applying Tustin approximation (i.e. continuous to discrete C2D filter).

$$\text{Filtered bandwidth, } B_I = \alpha_i B_{i-1} + (1-\alpha_i)\left(\frac{(B_i + B_{i-1})}{2}\right)$$

where $B_i$ is current estimated bandwidth.

At 704, the method includes coping up with the network. In an embodiment, the method allows the congestion controller 110 to copy up with the network. The step in coping up with the network includes estimating bandwidth oscillations in NLOS←→LOS. The bandwidth/channel capacity depends on SINR.

$$\text{norm}=(B_f-B_I)+\text{SINR}_i-\text{SINR}_A$$

$$BW_E=B_f+g\times\text{norm}$$

where $\text{SINR}_i$, $\text{SINR}_A$, g is the current SINR, average SINR and clock granularity respectively.

At 706, the method includes calculating the congestion level parameter 'N' (i.e. congestion window control factor). In an embodiment, the method allows the congestion control factor estimator 114 to calculate the congestion level parameter 'N'. N is the congestion level parameter for max network utilization. N is aggressive,
when $BW_E-BW_C \uparrow$ i.e. underutilization.
N is passive,
when $BW_E-BW_C \sim 0$ i.e. full utilization.

$$N_{i+1} \leftarrow \max\left(1, N_i + 1 - \frac{BW_E - BW_C}{\alpha \times BW_E} W_i\right)$$

where $\alpha$ is D-TCP fairness metrics.

In other words, wireless networks being dynamic in nature, utilization of network bandwidth varies substantially in peak and non-peak hours. The above equation caters to these issues by managing the value of N to increase the congestion window for highly variable network conditions. $BW_E$ is the estimated bandwidth which we derive from the lower layer metrics such as RSRQ, RSRP, CQI, SINR and other network parameters whereas $BW_C$ is the currently available bandwidth or currently used bandwidth. If the difference between the estimated bandwidth and the currently available bandwidth is positive, it signifies that the network is being underutilized, hence, the value of N is selected to increase the congestion window aggressively by a factor of N to accommodate more users. Whereas, if the difference is approximately 0, then the value of N is selected in such a way to increase the congestion window passively or gradually by the factor of N.

At 708, the method includes adaptively increasing or decreasing the congestion window. In an embodiment, the method allows the congestion window adjuster 116 to adaptively increase or decrease the congestion window.

For each RTT: CWND←CWND+$N_{i+1}$

For each Loss: CWND←CWND(1−y where $$y = \frac{\eta}{([2\eta - 1]N] + 1)}$$

The various actions, acts, blocks, steps, or the like in the flow diagram 700 may be performed in the order presented, in a different order or simultaneously. Further, in some embodiments, some of the actions, acts, blocks, steps, or the like may be omitted, added, modified, skipped, or the like without departing from the scope of the invention FIG. 8 is a schematic diagram illustrating passing of information of the real time available bandwidth $BW_E$ from the lower layer of the modem to the higher layer of the TCP Stack for adjusting the CWND, according an embodiment as disclosed herein. The CP is configured to generate metric values with the help of parameters like Channel Quality Indicator (CQI), SINR, Reference Signal Received Power (RSRP), RSSI and RSRQ from lower layers. The CP is configured to communicate the parameters to the AP through IPC. In response to receiving the parameters, the AP is configured to derive the dynamic congestion window control factor $N_{i+1}$. Further, an L4 module of the AP is configured to dynamically modify the CWND based on the derived dynamic congestion window control factor $N_{i+1}$.

In an embodiment, the TCP congestion is dynamically controlled by estimating the UL bandwidth and modem layer parameters includes the overhead deduction from the CP. Further, the real time available bandwidth $BW_E$ for fresh UL data is determined by subtracting the overhead deduction from the estimated UL bandwidth.

Once the TCP congestion occurs, the electronic device 100 decreases the CWND to a certain level (e.g. lower than legacy), and gradually increases the CWND to a previous state based on the information of the real time available bandwidth. Therefore, the method enables the electronic device 100 to efficiently control the CWND for a better network utilization especially in case of lossy and high-BDP conditions.

In another embodiment, an initialization of the electronic device 100 includes updating the CWND to 2×γ, ssthresh to 65535 and enabling D-TCP_reset( ). In response to detecting the packet loss, the electronic device 100 updates the CWND to $$\left(CWND - CWND \times \frac{\eta}{[(2\eta - 1)N] + 1}\right)$$

and ssthresh to CWND.

In response to detecting the D-TCP_reset( ), the electronic device 100 updates a value of N to 1, the α to 0.2 and epoch_start to tcp_time_stamp. In response to detecting a timeout, the electronic device 100 updates the CWND to 2×γ and enables the D-TCP_reset( ). Further, the electronic device 100 performs N_updates( ), if tcp_time stamp( )-epoch start>update_epoch, then epoch_start updates to time_ stamp. Further, if currentBW<estimatedBW, then temp updates to max(1.0, prenValue), nValue updates to nValue+ temp and prenValue updates to nValue. In an embodiment, the electronic device 100 performs N_updates( ):, if currentBW>estimatedBW then nValue updates to nValue+1, prenValue updates to nValue.

FIG. 9 is a flow diagram 900 illustrating steps in estimating the real time available bandwidth $BW_E$ for the upload, according to an embodiment as disclosed herein. At 902, the method includes storing the number of the carriers. In an embodiment, the method allows the congestion controller 110 to store the number of the carriers. At 904, the method includes obtaining the TBS index for each carrier based on the MCS index, as per 3GPP 36.213. In an embodiment, the method allows the congestion controller 110 to obtain the TBS index for each carrier based on the MCS index, as per 3GPP 36.213.

At 906, the method includes determining the transport block size is calculated for each carrier based on the TBS index and the PRB. In an embodiment, the method allows the congestion controller 110 to determine the transport block size is calculated for each carrier based on the TBS index and the PRB. At 908, the method includes determining the throughput for each carrier with the consideration of MIMO is used or not. In an embodiment, the method allows the congestion controller 110 to determine the throughput for each carrier with the consideration of MIMO is used or not. At 910, the method includes estimating the combine throughput by adding the throughput for each carrier. In an embodiment, the method allows the congestion controller 110 to estimate the combine throughput by adding the throughput for each carrier.

The various actions, acts, blocks, steps, or the like in the flow diagram 900 may be performed in the order presented, in a different order or simultaneously. Further, in some embodiments, some of the actions, acts, blocks, steps, or the like may be omitted, added, modified, skipped, or the like without departing from the scope of the invention.

FIG. 10 is a flow diagram 1000 illustrating steps in determining the overhead deduction, according to an embodiment as disclosed herein. At 1002, the method includes determining the L2/L3 header overhead by averaging. In an embodiment, the method allows the congestion controller 110 to determine the L2/L3 header overhead by averaging. At 1004, the method includes averaging the UL bandwidth for DL acknowledgements, in case DL flow is on. In an embodiment, the method allows the congestion controller 110 to average the UL bandwidth for DL acknowledgements, in case DL flow is on. At 1006, the method includes determining the UL data retransmission (L2/L3) rate by averaging. In an embodiment, the method allows the congestion controller 110 to determine the UL data retransmission (L2/L3) rate by averaging.

The various actions, acts, blocks, steps, or the like in the flow diagram 1000 may be performed in the order presented, in a different order or simultaneously. Further, in some embodiments, some of the actions, acts, blocks, steps, or the like may be omitted, added, modified, skipped, or the like without departing from the scope of the invention.

FIG. 11 is a schematic diagram of growth in a no loss period of the CWND, according to an embodiment as disclosed herein. Consider, an example model for deriving an approximate throughout by using the proposed method. The equation-13 is rewritten as given in equation-16 by using an Adaptive Increase Adaptive Decrease (AIAD) paradigm.

$$\text{For each RTT:} CWND \leftarrow CWND + N \quad \text{[Equation-16]}$$

The equation-14 is rewritten as given in equation-17 by using an Adaptive Increase Adaptive Decrease (AIAD) paradigm.

$$\text{For each Loss: } CWND \leftarrow CWND(1-y) \quad \text{[Equation-17]}$$

where, y is given in equation-18

$$y = \frac{\eta}{[(2\eta - 1)N] - 1)} \quad \text{[Equation-18]}$$

In an example, η is selected as 2. Therefore, y=3/(2N+1). For TCP Reno N=1, hence y=½. As shown in the FIG. 10, the CWND W is on AIAD paradigm as given in the equation-17. A period between two consecutive packet losses are defined as the No Loss Period (NLP). For $i^{th}$ iteration during time $T_i$, $P_i$ packets are being transferred. Hence, an expected steady state TCP throughput (TP) based on the packet and the time is given in equation-19.

$$TP = \frac{E[P]}{E[T]} \quad \text{[Equation-19]}$$

During $NLP_i$, the CWND increase by $N_i$ for each RTT and decrease by 1-y for each loss. Hence, the packet received at the $i^{th}$ duration is given in equation-20.

$$P_i = \sum_{k=0}^{X_i - 1} N_i \cdot K + (1 - y_{i-1}) \cdot W_{i-1} \cdot X_i \quad \text{[Equation-20]}$$

$$= \frac{X_i \cdot (X_i - 1)}{2} * N_i + (1 - y_{i-1}) \cdot W_{i-1} \cdot X_i$$

where K is the looping variable and $X_i$ is the packet received during $i^{th}$ iteration.

The CWND at the end of $NLP_i$ is given in equation-21.

$$W_i = (1 - y_{i-1}) \cdot W_{i-1} + N_i \cdot X_i \quad \text{[Equation-21]}$$

The equation-20 is rewritten as equation-22 by substituting the equation-21 to the equation-20.

$$P_i = X_i \left(\frac{(1 - y_{i-1}) \cdot W_{i-1} + W_i - N_i}{2}\right) \quad \text{[Equation-22]}$$

The packet expectation E[P] is inversely propositional to the expected packet loss probability ρ. Hence, E[P]=1/ρ. Hence, equation-22 is rewritten as in equation-23.

$$\frac{1}{\rho} = E[X]\left(\frac{(2-E[y]).E[W]-E[N]}{2}\right) \quad \text{[Equation-23]}$$

According to the equation-21, the expectation in round $X_i$ is given in equation-24.

$$E[X] = \frac{E[y].E[W]}{E[N]} \quad \text{[Equation-24]}$$

Equation-25 is obtained by solving E[X] using equation-23 and equation-24.

$$E[X] = \frac{E[y]}{2.(2-E[y])} + \sqrt{\left(\frac{E[y]}{2.(2-E[y])}\right)^2 + \frac{2.E[y]}{\rho.E[N](2-E[y])}} \quad \text{[Equation-25]}$$

Consider that the ρ is very small, the equation-25 is written as equation-26

$$E[X] = \sqrt{\frac{2.E[y]}{\rho.E[N].(2-E[y])}} + o\left(\frac{1}{\sqrt{\rho}}\right) \quad \text{[Equation-26]}$$

Consider, $r_{i,j}$ as a randomly distributed value of $j^{th}$ iteration of NLP, with $P_i = \Sigma_{j=1}^{X_i} r_{i,j}$. Using the equation-21, where values $r_{i,j}$ are independent of j and CWND, the equation-27 is given as, $$E[T]=E[X] \cdot E[r]=E[X] \cdot RTT \quad \text{[Equation-27]}$$

Equation-28 is obtained by substituting equation-26 and equation-27 in the equation-19.

$$TP = \frac{1}{\rho.E[T]} = \frac{1}{\rho.E[X].RTT} \quad \text{[Equation-28]}$$
$$= \frac{1}{\rho.RTT\left(\sqrt{\frac{E[y]}{\rho.E[N].(2-E[y])}} + o\left(\frac{1}{\sqrt{\rho}}\right)\right)}$$

For D-TCP, when η is set to 2, then E[y]=2/(3E[N]−1). Therefore, the approximate throughput model for D-TCP using equation-18 is given in equation-29.

$$TP_{DTCP} = \frac{E[N]}{RTT}\sqrt{\frac{3}{2.\rho}} \quad \text{[Equation-29]}$$

For TCP Reno, E[N]=1 as N is always 1. Hence, the throughput model for the TCP Reno is given in equation-30.

$$TP_{RENO} = \frac{1}{RTT}\sqrt{\frac{3}{2.\rho}} \quad \text{[Equation-30]}$$

When η is selected as 2, then D-TCP flows E[N] times TCP RENO flows. For multcp, the throughput model is given in equation-31.

$$TP_{multcp} = \frac{1}{RTT}\sqrt{\frac{E[N](4E[N]-1)}{2.\rho}} \quad \text{[Equation-31]}$$

which is not exactly E[N] times TCP Reno. Hence, D-TCP AIAD method is stable when η is set to 2.

According to equation-12, the expectation of the N is given in equation-32.

$$E[N] = \max\left(1, \frac{\alpha.E[BW_E]}{\delta B}\right) \quad \text{[Equation-32]}$$

where, $\delta B = E[BW_E] - E[BW_C]$ is the over/under-utilized bandwidth estimation.

Therefore, the approximate throughput model for D-TCP is given in equation-33.

$$TP_{DTCP} = \max\left(\frac{1}{RTT}, \frac{\alpha}{\delta B}\right)\sqrt{\frac{3}{2.\rho}} \quad \text{[Equation-33]}$$

In an embodiment, the efficiency attained by the electronic device 100 using the proposed method is determined based on network utilization, friendliness and fairness.

Consider, a network model which consists of L links l∈(1, 2 ... L) each with bandwidth $B_l$. There are S TCP session flows in this link. The routing matrix for LXS is denoted as R. For each TCP session s∈(1, 2 ... S), $$R_{l,s} = \begin{cases} 1 & \text{if session } s \text{ traverse in link } l \\ 0 & \text{otherwise} \end{cases}$$

The link l has RTT $D_l$ and packet loss rate $P_l$ which is independent of the congestion and depends on the link l. Each link has congestion metrics $x_l$ which is measured using the packet loss due to congestion $p_l$ and queuing delay $q_l$. Hence, $x_l = m_l(p_l, q_l)$. The throughput for a session is given in equation-34.

$$T_s = f_s(x) \quad \text{[Equation-34]}$$

According to the equation-28 the network reaches equilibrium under the condition given in equation-35.

$$RT \leq B, X(RT-B)=0 \quad \text{[Equation-35]}$$

The equilibrium defined in the equation-30 exists if the network meets three conditions given below:
1) $T_s = f_s(x_l, x_{-l})$ is a non-increasing function of $x_l$ for any fixed $x_{-l} = (x1, \ldots x_{l-1}, x_{l+1}, \ldots, x_L)^T$;
2) 8>0, there exists a $x_{max}$ such that if $x_l > x_{max}$ for link l, then $T_s(x1) < \epsilon$; ∇s where $R_{l,s}=1$;
3) If (RT−B)=0, then D-TCP flows can reach equilibrium. The packet loss and the queuing delay due to congestion $p_l$ and $q_l$ increases as the network gets more congested. Consider three assumptions given below:
1) If there is no congestion then $p_l = q_l = 0$. Hence, m(0,0)=0.
2) $x_l = m(p_l, q_l)$ is a strictly increasing function of $p_l$ and $q_l$.

3) For each link l, $p_l$ is non-decreasing as the $q_l$ increases and vice versa.

$p_s$ is the end-to-end congestion packet loss event rate and $q_s$ is the delay due to congestion in a particular TCP session s, defined as:

D-TCP in equation-36, $x_s$ tends to infinity. This contradicts the proof that RT≤B. Therefore, D-TCP satisfy (RT-B)=0. Hence, network with D-TCP can reach equilibrium. A comparison of throughput of various TCP models are given in Table-1.

TABLE 1 comparison of throughput of TCP models

| TCP Variants | Throughput Models | Upper Bounds | Fairness Index $\gamma = T_i(D_i)/T_j(D_j)$ |
|---|---|---|---|
| D-TCP | $T = \max\left(\frac{1}{RTT}, \frac{\alpha}{\delta B}\right)\sqrt{\frac{3}{2\cdot\rho}}$ | × | $\gamma = 1$ (when $E[N] > 1$) |
| Reno | $T = \frac{1}{D+q}\sqrt{\frac{3}{2(P+p)}}$ [20] | $T \leq \frac{1}{D}\sqrt{\frac{3}{2P}}$ | $\gamma = \frac{D_j+q}{D_i+q}$ |
| CTCP | $T = \frac{1}{D+q}\frac{\Lambda}{(P+p)^{\frac{1}{2-k}}}, \Lambda = \frac{\left(\frac{1-(1-\beta')^{2-k}}{2-k}\right)^{\frac{1-k}{2-k}}}{\alpha'^{\frac{1}{2-k}}(1-(1-\beta')^{1-k})}$ where, $\alpha'$, $\beta'$ and $k$ are preset parameters. [21] | $T \leq \frac{1}{D}\frac{\Lambda}{P^{\frac{1}{2-k}}}$ | $\gamma \leq \left[\frac{D_j+q}{D_i+q}\right]^2$ [8] |
| Veno | $T = \frac{1}{D+q}\sqrt{\frac{1+\gamma'}{2(1-\gamma')(P+p)}}$, where $\frac{1}{2} \leq \gamma' \leq \frac{4}{5}$. [22] | $T \leq \frac{1}{D}\sqrt{\frac{1+\gamma'}{2(1-\gamma')P}}$ | $\gamma = \frac{(D_j+q)\sqrt{(1+\gamma_i')(2(1-\gamma_j')(P+p))}}{(D_i+q)\sqrt{(1+\gamma_j')(2(1-\gamma_i')(P+p))}}$ |
| Westwood | $T = \frac{1}{\sqrt{(D+q)((P+p)D+q)}}\sqrt{\frac{(1-(P+p))}{P+p}}$ [23] | $T \leq \frac{1}{DP}\sqrt{1-P}$ | $\gamma = \sqrt{\frac{(D_j+q)((P+p)D_j)+q}{(D_i+q)((P+p)D_i)+q}}$ |
| Vegas/FAST | $T = \alpha''/q$, where $\alpha''$ is preset parameter. [24] [25] | × | $\gamma = 1$ |

$$p_s = 1 - \prod_{l \in L}(1 - R_{l,s}p_l) \quad q_s = \sum_{l \in L} R_{l,s}.q_l$$

Ds is the end-to-end RTT and Ps is the random packet loss of session s, defined as:

$$P_s = 1 - \prod_{l \in L}(1 - R_{l,s}P_l), \quad D_s = \sum_{l \in L} R_{l,s}.D_l$$

The throughput function for DTCP in the equation-34 is expressed in equation-36

$$T_s = f_s(x) = f_s(x1, \ldots xl) = f_s(m_l(p_1, q_1), \ldots, m_l(p_1, q_1)) \quad \text{[Equation-36]}$$

$$= \max\left(\frac{1}{D_s+q_s}, \frac{\alpha}{\delta B.q_s}\right)\sqrt{\frac{3}{2.(P_s+p_s)}}$$

With reference to the assumptions (1) and (2) and the equation-27,
1) If $R_{l,s}=1$, then $T_s$ is a strictly decreasing function of $x_l$;
2) If $R_{l,s}=0$, then $T_s$ is a constant;
3) Letting $T_s=\epsilon$; $x_{max}=f_s^{-1}(T_s)$ and $x_l > x_{max}$ implies $x_s(p_l) < x_s = \epsilon$.

Therefore, $T_s$ is a non-increasing function and the first condition holds. Consider, that equilibrium is at X=0, then $p_s=q_s=0$ ∇ session in s. From the throughput equation of A TCP congestion control method is TCP friendly if it operates fair with TCP Reno algorithm. Let $\hat{T}_R$ be the average throughput of S TCP Reno flows. K of the S Reno flows replaces with D-TCP flows. Let $\hat{T}_D$ be average throughput of rest M flows given by M=S−K TCP Reno flows.

The throughput difference of the TCP Reno flows caused by D-TCP is given in equation-37.

$$\hat{T}_\delta = \hat{T}_R - \hat{T}_D \quad \text{[Equation-37]}$$

If $\hat{T}_\delta$ is close to 0, then D-TCP is said to be Reno friendly. D-TCP is TCP Reno friendly i.e. $\hat{T}_\delta = 0$ if $\alpha \leq q_r/(D+q_r)$.

$\hat{T}_R$ is rewritten as in equation-38.

$$\hat{T}_R = \frac{1}{D+q_r}\sqrt{\frac{3}{2(P+p_r)}} \quad \text{[Equation-38]}$$

From equation-36 the throughput of the D-TCP is written as in equation-39.

$$\hat{T}_D = \max\left(\frac{1}{D+q_d}, \frac{\alpha}{\delta B.q_s}\right)\sqrt{\frac{3}{2.(P+p_d)}} \quad \text{[Equation-39]}$$

where $q_d$ and $p_d$ is the queuing delay and packet loss respectively, when replacing K TCP Reno connection with D-TCP congestion control method.

Solving the equation-38 and the equation-39, when $\alpha \leq q_r/(D+q_r)$, then $\hat{T}_R = \hat{T}_D$. Hence, $\hat{T}_\delta = \hat{T}_R - \hat{T}_D = 0$. The propose method is TCP friendly by selecting $\alpha$ as $\alpha \in \{0.1, \ldots 0.5\}$.

According to the equation-29, the TCP method is fair if throughputs for TCP flows with similar loss rate but different RTTs are the same.

If there are two flows i and j using D-TCP if $TP_i=TP_j$ then D-TCP maintains intra fairness.

According to the throughput model given in the equation-33 when E[N]>1, $TP_{DTCP}=(\alpha/\delta B)\sqrt{3/2 \cdot \rho}$. $\alpha$ set as the same value for all the flows. Hence the ratio of the two flows is written as:

$$\gamma_{DTCP} = \frac{TP_i}{TP_j} = \frac{q_i}{q_j}\sqrt{\frac{P+p_j}{P+p_i}}$$

As i and j shares the same bottleneck link, $p_i=p_j$ and $q_i=q_j$. Hence, $\gamma_{DTCP}=1$ and $TP_i=TP_j$ The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method performed by an electronic device, for dynamically controlling a Transmission Control Protocol (TCP) congestion window, comprising a modem, a communication processor (CP) being a lower layer of the modem, a TCP stack, and an application processor (AP) being a higher layer of the TCP stack, comprising:
estimating a real time available bandwidth for an available network;
deriving a dynamic congestion window control factor from the estimated real time available bandwidth; and
modifying a congestion window based on the derived dynamic congestion window control factor,
wherein the congestion window is modified by passing information of the real time available bandwidth from the CP of the electronic device to the AP of the electronic device and adjusting the congestion window by the AP of the electronic device, and
wherein deriving the dynamic congestion window control factor from the estimated real time available bandwidth comprises:
estimating at least one of a size of a file to be uploaded, a quality of service, network conditions, or a priority based dynamic adaptation;
identifying an actual packet loss from a spurious packet loss based on at least one of the size of the file to be uploaded, the quality of service, the network conditions, or the priority based dynamic adaptation; and
deriving the dynamic congestion window control factor from the estimated real time available bandwidth based on the actual packet loss.

2. The method of claim 1, wherein estimating the real time available bandwidth comprises:
determining traffic associated with the available network;
applying a Continuous to Discrete (c2d) time variant filter based on the traffic;
extracting a plurality of characteristics associated with the available network based on the c2d time variant filter, wherein the plurality of characteristics comprise at least one of a traffic intensity, a link capacity, or a packet sending rate to derive the real time available bandwidth; and
estimating the real time available bandwidth based on the plurality of characteristics.

3. The method of claim 1, wherein modifying the congestion window based on the derived dynamic congestion window control factor comprises increasing the congestion window or decreasing the congestion window.

4. The method of claim 3, wherein increasing the congestion window comprises:
determining a current bandwidth of a connection;
dynamically determining whether with the current bandwidth is lower than the estimated real time available bandwidth;
aggressively increasing the congestion window when the current bandwidth is lower than the estimated real time available bandwidth; and
steadily increasing the congestion window when the current bandwidth is not lower than the estimated real time available bandwidth.

5. The method of claim 3, wherein decreasing the congestion window comprises:
determining whether network conditions are fluctuating;
deriving whether a packet loss is due to congestion or due to the fluctuating network conditions;
determining the dynamic congestion window control factor when the packet loss is due to the fluctuating network conditions; and
decreasing the congestion window based on the dynamic congestion window control factor.

6. The method of claim 5, wherein determining whether the network conditions are fluctuating comprises:
deriving a Signal to Interference plus Noise Ratio (SINR) and a Received Signal Strength Indication (RSSI) variations based on a filter based approach; and
determining whether the network conditions are fluctuating based on the SINR and the RSSI variations.

7. An electronic device for dynamically controlling a Transmission Control Protocol (TCP) congestion window, comprising:
a modem;
a communication processor (CP) being a lower layer of the modem;
a TCP stack;
an application processor (AP) being a higher layer of the TCP stack;
a memory; and
a congestion controller, coupled to the modem, the CP, the TCP stack, the AP, and the memory, configured to:
estimate a real time available bandwidth for an available network;
derive a dynamic congestion window control factor from the estimated real time available bandwidth; and
modify a congestion window based on the derived dynamic congestion window control factor,
wherein the congestion window is modified by passing information of the real time available bandwidth from the CP of the electronic device to the AP of the electronic device and adjusting the congestion window by the AP of the electronic device, and wherein the congestion controller is further configured to:
estimate at least one of a size of a file to be uploaded, a quality of service, network conditions, or a priority based dynamic adaptation;
identify an actual packet loss from a spurious packet loss based on at least one of the size of the file to be uploaded, the quality of service, the network conditions, or the priority based dynamic adaptation; and
derive the dynamic congestion window control factor from the estimated real time available bandwidth based on the actual packet loss.

8. The electronic device of claim 7, wherein the congestion controller is further configured to:
determine traffic associated with the available network;
apply a Continuous to Discrete (c2d) time variant filter based on the traffic;
extract a plurality of characteristics associated with the available network based on the c2d time variant filter, wherein the plurality of characteristics comprises at least one of a traffic intensity, a link capacity, or a packet sending rate to derive the real time available bandwidth; and
estimate the real time available bandwidth based on the plurality of characteristics.

9. The electronic device of claim 7, wherein modify the congestion window based on the derived dynamic congestion window control factor comprises increase the congestion window or decrease the congestion window.

10. The electronic device of claim 9, wherein the congestion controller is further configured to:
determine a current bandwidth of a connection;
dynamically determine whether with the current bandwidth is lower than the estimated real time available bandwidth;
aggressively increase the congestion window when the current bandwidth is lower than the estimated real time available bandwidth; and
steadily increase the congestion window when the current bandwidth is not lower than the estimated real time available bandwidth.

11. The electronic device of claim 9, wherein the congestion controller is further configured to:
determine whether network conditions are fluctuating;
derive whether a packet loss is due to congestion or due to the fluctuating network conditions;
determine the dynamic congestion window control factor when the packet loss is due to the fluctuating network conditions; and
decrease the congestion window based on the dynamic congestion window control factor, and wherein the congestion controller is further configured to:
derive a Signal to Interference plus Noise Ratio (SINR) and a Received Signal Strength Indication (RSSI) variations based on a filter based approach; and
determine whether the network conditions are fluctuating based on the SINR and the RSSI variations.

* * * * *